Jan. 13, 1970  N. H. LIEB ET AL  3,488,849
REEL
Filed April 21, 1966  6 Sheets-Sheet 2

INVENTORS.
NATHANIEL H. LIEB
ANTHONY J. TURCHI
BY
Caesar, Rivise
Bernstein & Cohen
ATTORNEYS.

United States Patent Office 3,488,849
Patented Jan. 13, 1970

3,488,849
REEL
Nathaniel H. Lieb, Philadelphia, and Anthony J. Turchi, Bala Cynwyd, Pa., assignors to Star Dental Manufacturing Co., Inc., Philadelphia, Pa., a corporation of Delaware
Filed Apr. 21, 1966, Ser. No. 544,172
Int. Cl. A61c 1/00, 17/00
U.S. Cl. 32—22    10 Claims

ABSTRACT OF THE DISCLOSURE

A reel for flexible tubing comprising a wheel having a flexible tube wound thereon. A spring is provided to rotate the wheel to wind the tube thereon. A ratchet wheel is associated with the tube wheel and a pawl is associated with the ratchet wheel, which ratchet wheel and pawl permit the unwinding of the tube but prevent the rewinding of the tube on the tube wheel.

A device for furnishing fluid to a dental instrument comprising a plate, at least one tube passing through the plate, said tube adapted to supply fluid to a dental instrument secured at the end thereof, and releasable stop means associated with the tube. The stop means permits the tube to be pulled through the plate for any desired length but prevents the tube from being retracted through the plate when the length is reached. Means are provided for retracting the tube through the plate and electrical means are provided for releasing the stop means to permit the retraction of the tube through the plate.

---

This invention relates to a reel, and more particularly, to a device for retracting and storing the flexible air and water tubing attached to various items of dental equipment which utilize air or water.

It is now common practice in the dental art to provide a single console cabinet for storing such varied dental equipment as handpieces, syringes, and chip blowers. Each of these items utilizes air or water, or both, in its operation. The air and water is supplied to the equipment through flexible tubing which is maintained within the console cabinet. Prior to this invention, the flexible tubing would hang within the console cabinet in the form of a loop. The dental equipment, for instance, a handpiece, could be pulled outward from the console which would cause the bottom of the loop to rise within the console. A pulley was in contact with the bottom of the loop and the pulley would provide a counterweight for the loop as the handpiece or other equipment would pull the tubing from the console.

A number of stop positions could be provided for the tubing. Thus, after the tubing had been pulled out to a certain extent, a stop within the console would prevent the counter-weighted pulley from withdrawing the handpiece and its associated tube back into the console. By utilizing a number of varying positioned stops, the length of tubing projecting from the console could be adjusted.

Whenever it was desired to have the handpiece and its associated tubing withdrawn back into the console, it was necessary to pull the tubing out to its greatest extent which would release the stop mechanisms and permit the counter-weighted pulley to withdraw the tubing completely into the console. The back end of the handpiece would serve as a stop to prevent the handpiece from being drawn completely into the console.

The reel of this invention is adapted to be used in the console housings of the prior art. However, the reel mechanism itself provides a number of distinct advantages over the prior art counter-weighted mechanisms for withdrawing the flexible tubing.

It is therefore an object of this invention to provide a novel reel.

It is another object of this invention to provide a reel mechanism for use in dental consoles.

It is a further object of this invention to provide a reel mechanism for dental equipment having an infinite number of stop positions for withdrawing flexible tubing wound on the reel.

It is a further object of this invention to provide a reel mechanism that is electrically controlled for withdrawing flexible tubing attached to dental equipment, and which electrical controls can be actuated by the dental equipment and the flexible tubing.

It is a further object of this invention to provide a reel for flexible tubing attached to dental equipment wherein there is substantially instantaneous stopping of the withdrawing of the reel at substantially any position of withdrawal.

These and other objects of this invention are accomplished by providing a reel for flexible tubing comprising a wheel, said wheel adapted to have at least one flexible tube wound thereon, said flexible tube adapted to have a fluid passed therethrough, spring means urging said wheel in a first rotational direction, said rotational direction adapted to wind said tube on said wheel, ratchet means associated with said wheel, a pawl associated with said ratchet means, said ratchet means and pawl adapted to permit the withdrawing of said flexible tube from said wheel against the urging of said spring means, and adapted to prevent the rewinding of said flexible tube onto said wheel, and means for disengaging said pawl from said ratchet to permit the rewinding of said flexible tube under the urging of said spring means.

Other objects and many of the attendant advantages of this invention will be readily appreciated as the same becomes better understood by reference to the following detailed description when considered in connection with the accompanying drawings wherein:

FIG. 13 is a rear elevational view taken in the direction of line 13—13 in FIG. 9;

Figure 1:
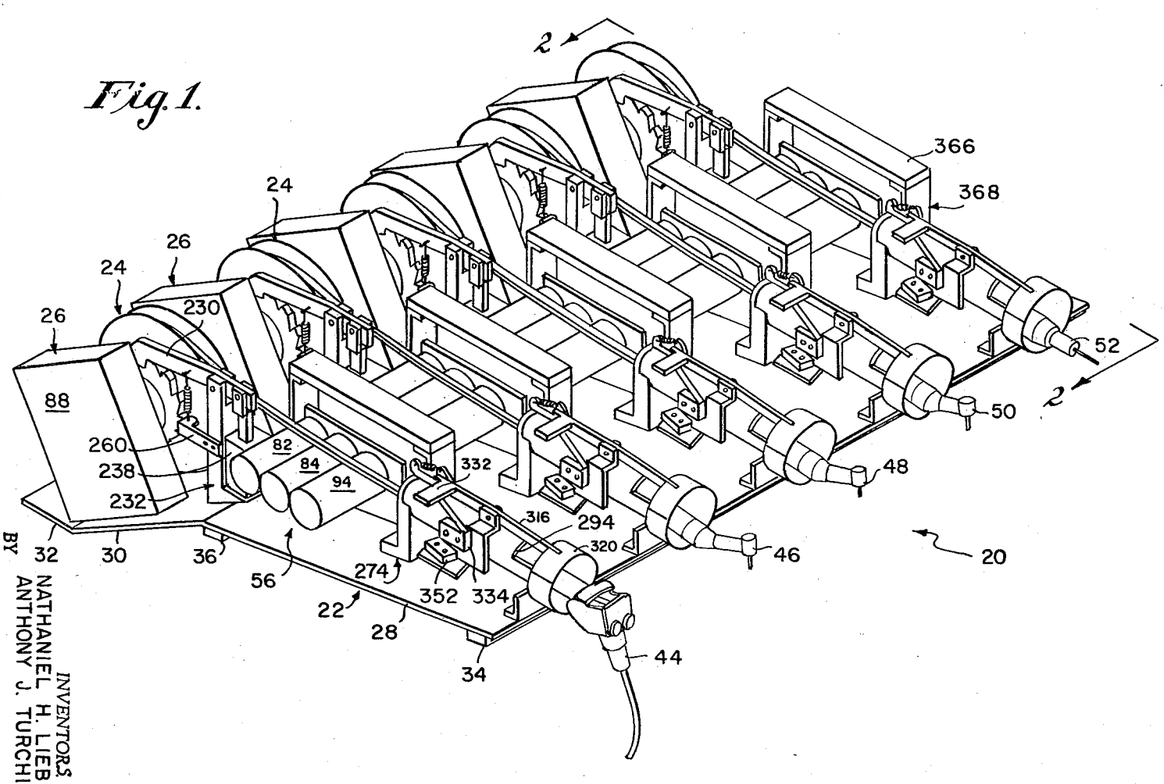
FIG. 1 is a simplified perspective view of the reel of this invention.

Referring now in greater detail to the various figures of the drawings wherein similar reference characters refer to similar parts, a reel embodying the present invention is generally shown at 20 in FIG. 1. Device 20 basically comprises a mounting plate 22, a plurality of reel assemblies 24, a heater 26 associated with each reel assembly, and switching circuitry associated with each reel assembly, which will be described in detail hereinafter.

Figures 2, 14, 15:
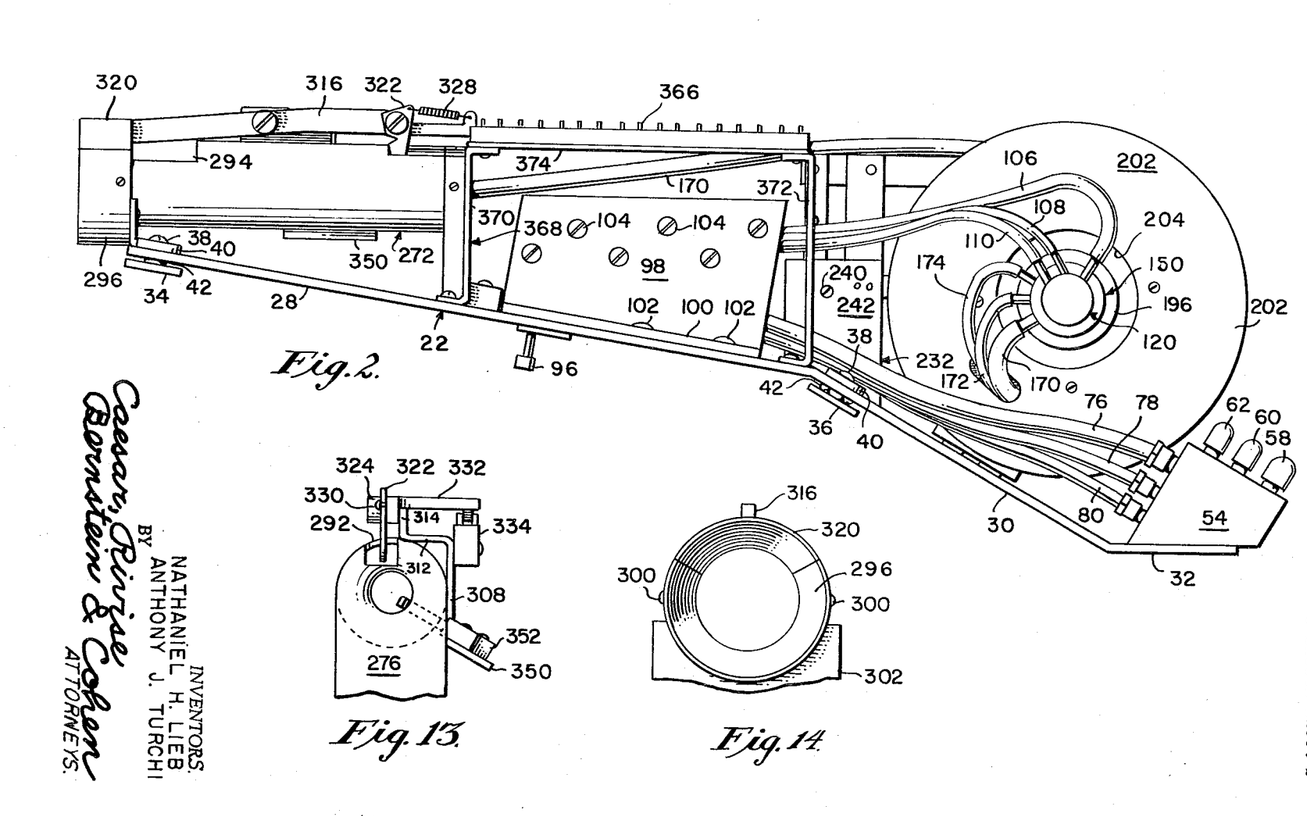
FIG. 2 is an enlarged side elevational view taken in the direction of line 2—2 of FIG. 1.
FIG. 14 is a front elevational view taken in the direction of line 14—14 in FIG. 9.
FIG. 15 is a wiring diagram for the reel of this invention.

Plate 22 includes a forward section 28 which is inclined downwardly in going from the front to the rear. A second inclined section 30 projects rearwardly from section 28. Section 30 is unitary with section 32 which projects horizontally rearward from the rear edge of section 30. A reinforcing bar 34 projects across the entire bottom surface of the front edge of section 28. A second reinforcing bar 36 projects across the entire bottom of the forward portion of inclined section 30. Bars 34 and 36 may be maintained in place by any suitable means such as bolts 38 and associated washers 40. As seen in FIG. 2, bars 34 and 36 are vertically spaced by spacer washers 42 from plate 22. Thus, these bars may also be used concealing any bolt heads and nuts which project below the bottom surface of plate 22.

In the embodiment of this invention shown in FIG. 1, plate 22 is used in connection with five separate dental instruments. By way of example, it can be used for supporting and supplying water or air, or both, to a syringe 44, contra-angle handpieces 46, 48 and 50, and straight handpiece 52. Each piece of dental equipment has associated therewith a heater 26, a reel mechanism 24 and a manifold block 54 (FIG. 2). For ease of assembly, plate 22 can be divided into five separate sections with the heater, reel assembly, manifold block, and other ancillary structure first assembled on each section. Thereafter, the five sections can be joined by supporting bars 34 and 36. The final device will function identically regardless of whether the plate 22 is unitary or formed from sections.

Figures 3, 4:
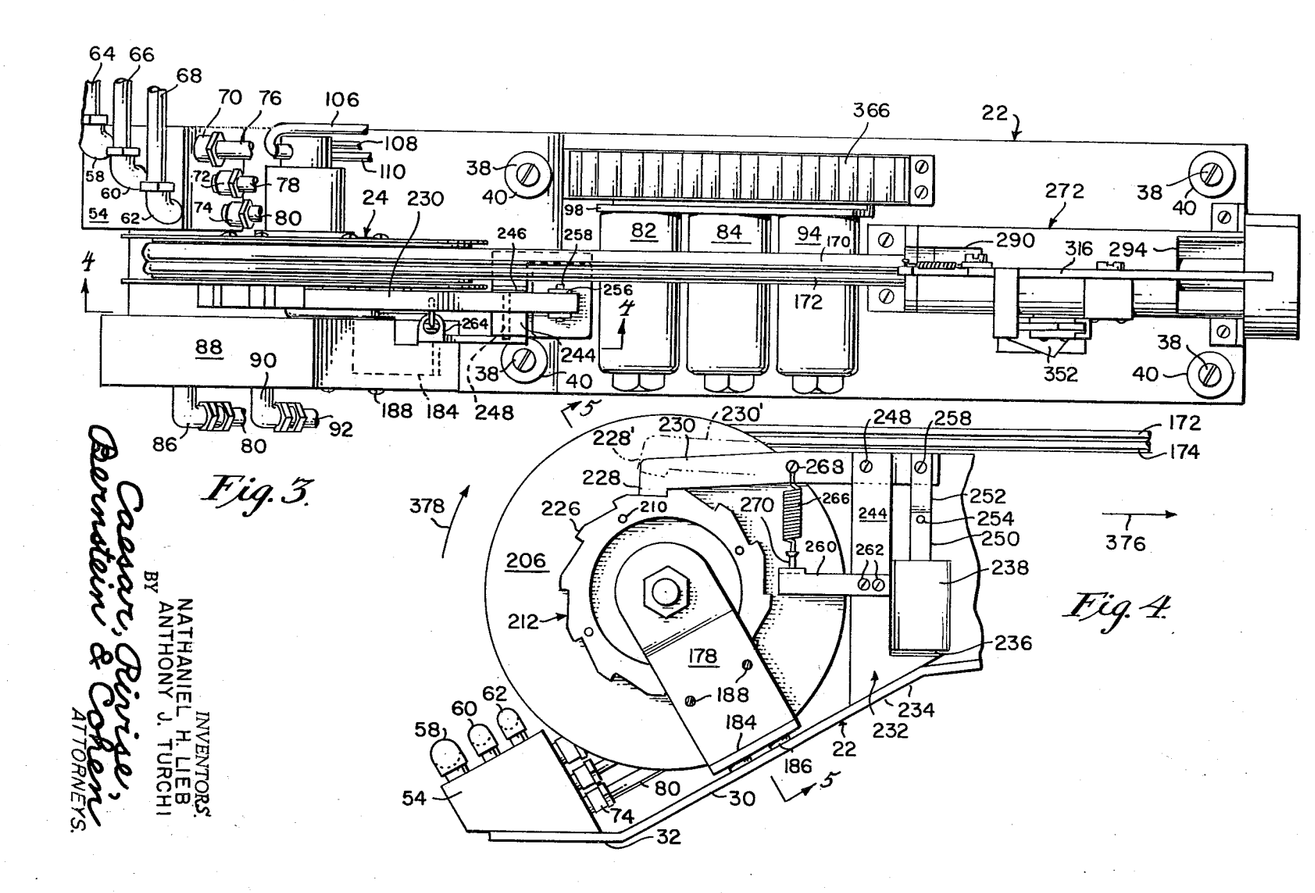
FIG. 3 is an enlarged plan view of one complete retraction element of the reel of this invention.
FIG. 4 is a sectional view taken along the line 4—4 of FIG. 3.

Since the structure associated with each element of dental equipment is identical to the structure of the other four elements, the structure for only one element will be described in detail. By way of example, the left-hand assembly in FIG. 1, which is designated generally at 56, is shown in detail in FIG. 3 of the drawings. As seen in FIGS. 3 and 4, manifold block 54 is mounted on horizontal section 32 of mounting plate 22. The top of manifold 54 is provided with three staggered nipples 58, 60 and 62. Each nipple is connected to a separate channel within the manifold 54. As seen in FIG. 3, nipples 58, 60 and 62 are connected to tubes 64, 66 and 68, respectively. Tube 64 is larger in diameter than tubes 66 and 68. The purpose of tube 64 is to carry air to a dental handpiece for use for rotative power and on some occasions for use by supplying the air as a dispersant for an air-water spray. Tubes 66 and 68 are of the same diameter and are used for conveying air and water. Since the tubes are of the same diameter, the one which carries air and the one which carries water can be interchanged. By way of example, tube 62 will carry water. The purpose of the water tube is to provide the water for use in an air-water spray in a handpiece or for use in a syringe. The smaller air tube 66 is used for a chip blower or for supplying the air in an air-water mixture for use as a spray associated with a dental handpiece.

The two air lines and the water line for furnishing the fluid for tubes 64, 66 and 68 are connected to a central manifold on the rear of plate 22. Through series connections by the use of T connectors, the air and water are fed from the central manifold to a manifold 54 associated with each reel assembly 24. Each manifold 54 contains three spaced channels. Thus, as is apparent from FIG. 3, air entering through nipple 58 will pass through a channel in manifold 54 and exit through nipple 70. Likewise, air or water passing through nipple 60 will exit through nipple 72 and air or water passing through nipple 62 will exit through nipple 74. With the exception of the three spaced channels, manifold 54 comprises a solid block. A material which has been found to be useful for the block is brass, because of its corrosion resistance.

Nipples 70, 72 and 74 have tubes 76, 78 and 80, respectively, associated therewith. Air tubes 76 and 78 (FIG. 2) are connected to the inlet side of solenoids 82 and 84, respectively. Water tube 80 is connected with a nipple 86 (FIG. 3) which is mounted on heater block 88. Heater block 88, in turn, is mounted on inclined section 30 (FIG. 3) of mounting plate 22. After passing through heater block 88, the water exits through nipple 90 and into tube 92.

Heater 26 is a standard resistance heater. The water entering the heater block 86 passes through a tortuous channel in the block during which time it is heated. Tube 92 containing the heated water is connected to the inlet side of solenoid 94. The volume of water entering the solenoid is controlled by needle valve 96.

The solenoids are mounted on inclined section 28 of mounting plate 22 by vertical plate 98 (FIG. 2). Plate 98 includes a flange 100 which is secured to section 28 by any suitable means, such as bolts 102. The solenoids 82, 84 and 94 are horizontally mounted on plate 98 by bolts 104 (FIG. 2).

Figure 7:
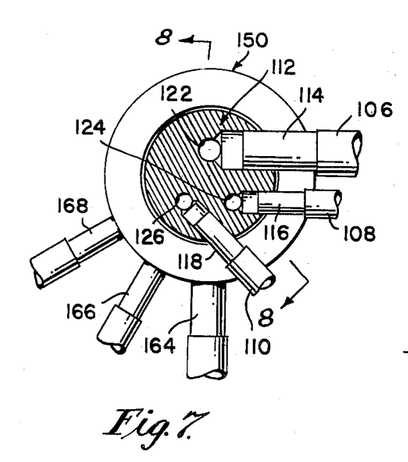
FIG. 7 is an enlarged sectional view taken along the line 7—7 of FIG. 5.

The air and water leaving solenoids 82, 84 and 94 passes through tubes 106, 108 and 110, respectively (FIG. 5) into distributor cap 112 through nipple 114, 116 and 118, respectively (FIG. 7). Distributor cap 112 is secured on distributor shaft 120 (FIG. 8), as by a pressed fit. As seen in FIG. 7, distributor cap 112 includes channels 122, 124 and 126 which are in communication with nipples 114, 116, and 118, respectively. Channels 122, 124 and 126 are connected with channels 128, 130 and 132, respectively (FIG. 8), in distributor shaft 120 through nipples 134, 136 and 138, respectively. As further seen in FIG. 8, channels 128, 130 and 132 are in communication with annular grooves 140, 142 and 144, respectively, in distributor shaft 120. The grooves pass around the entire outer surface of the distributor shaft 120. An annular groove 146 is formed on each side of annular grooves 140, 142 and 144. Annular grooves 146 contain sealing rings 148.

Figure 8:
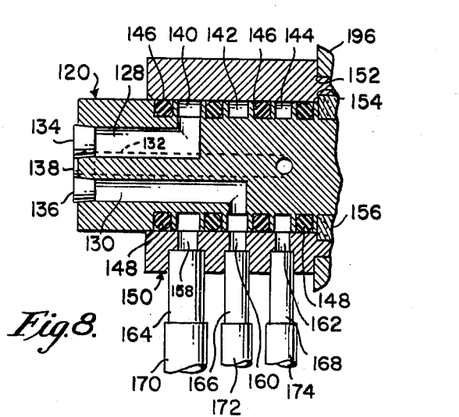
FIG. 8 is a sectional view taken along the line 8—8 of FIG. 7.

As seen in FIG. 8, a hollow tubular distributor body 150 is telescoped over distributor shaft 120. Distributor body 150 includes an outer annular recess 152 at one end and an inner annular recess 154 at the same end. Distributor body 150 is rotatably movable on distributor shaft 120 and includes a bearing 156 which is mounted on distributor shaft 120 and positioned in recess 154. Distributor body 150 includes ports 158, 160 and 162 (FIG. 8) which pass through the wall thereof. These ports contain nipples 164, 166 and 168, respectively. Ports 158, 160 and 162 are in communication with grooves 140, 142 and 144, respectively. Flexible tubes 170, 172 and 174 are secured on nipples 164, 166 and 168, respectively.

Figures 5, 6:
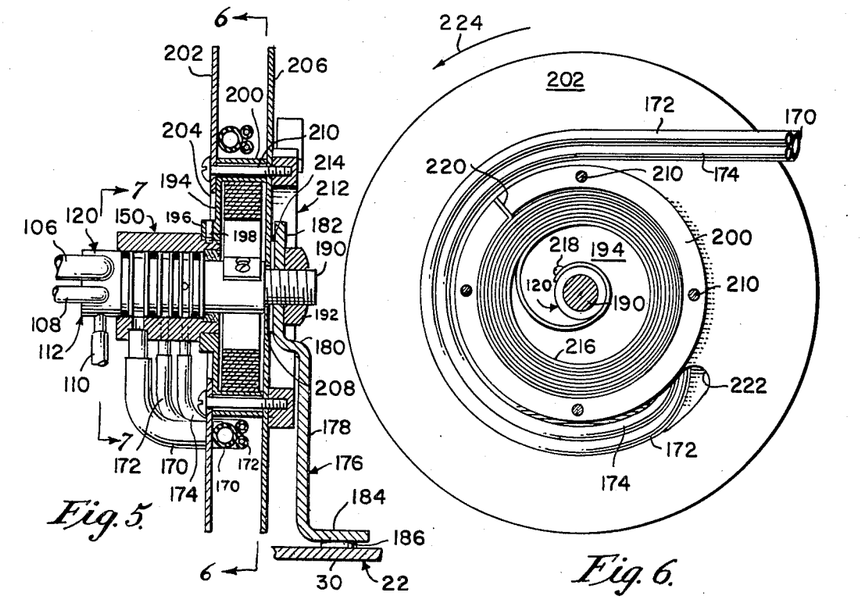
FIG. 5 is a sectional view taken along the line 5—5 of FIG. 4.
FIG. 6 is a sectional view taken along the line 6—6 of FIG. 5.

As seen in FIG. 5, a bracket 176 is mounted on section 30 of plate 22. Bracket 176 includes a first vertical section 178, a shoulder 180, and a second vertical section 182 which is offset from vertical section 178. A flange 184 projects perpendicularly from the bottom of vertical section 178 and is bolted to plate 22. Washers 186 space flange 184 from the plate. As seen in FIGS. 3 and 4, heater block 88 is secured to bracket section 178 by bolts 188.

As seen in FIG. 5, distributor shaft 120 includes a reduced end portion 190 which is threaded. End portion 190 passes through an opening in section 182 of bracket 176 and is secured in place by nut 192.

As seen in FIG. 5, a disc 194 having a central opening and an integral hub 196 is positioned at said opening. As seen in FIGS. 5 and 8, hub 196 is received in annular recess 152 of distributor body 150 and is secured in place by set screw 198 (FIG. 5). Thus the distributor body and disc 194 are integrally attached by set screw 198. Disc 194 also includes an integral annular flange 200 (FIGS. 5 and 6).

A circular plate 202 having a central opening 204 abuts disc 194. A second circular plate 206 having a central opening 208 abuts the outer edge of flange 200. Plates 202 and 206 are secured in place by bolts 210 which pass through each of the plates and through flange 200, and are threadedly secured in ratchet wheel 212, which will be described hereinafter. A bearing washer 214 abuts plate 206 and vertical section 182 of bracket 176. Distributor shaft 120 has the inner end of a coiled tension spring 216 (FIG. 6) secured thereon by set screw 218. The outer end of tension spring 216 includes a lip 220 which is received in a slot in flange 200.

Tubes 170, 172 and 174 pass through a slot 222 (FIG. 6) in plate 202. Thereafter, the tubes are wound around flange 200 on disc 194. The normal tendency of spring 216 is to cause the rotation of disc 194 in a counterclockwise direction as shown by the arrow 224 in FIG. 6. Thus, under the normal tendency of the spring, the tubes 170, 172 and 174 would be wound around flange 200 and can wind by plates 202 and 206. In FIG. 6, the tubes are shown in a substantially fully extended position.

As seen in FIG. 5, distributor shaft 120 is rigidly secured in place by mounting plate 176 and nut 192. Distributor cap 112 is integrally attached to shaft 120. Distributor body 150 is rotatably mounted on shaft 120. Since disc 194, plates 202 and 206, and ratchet wheel 212 are integrally connected to the distributor body through bolts 210 and set screw 198, they will be rotated whenever the distributor body is rotated.

Prior to using any given reel 24, the tubes 170, 172 and 174 will be wound around flange 200 under the urging of spring 216. As the tubes are withdrawn from the reel, the distributor body 150, plates 202 and 206, disc 194 and ratchet wheel 212 will all be rotated, while the distributor shaft 120 and its associated cap 112 remain stationary. When the air and water pass through the solenoids 82, 84 and 94, these fluids will enter the distributor shaft through tubes 106, 108 and 110. They will leave the shaft through annular grooves 140, 142 and 144 (FIG. 8) and pass through the rotatable distributor body 150 by way of nipples 164, 166 and 168. Sealing rings 146 prevent any leakage of the air and water from their respective annular grooves.

As pointed out above, a ratchet wheel 212 is secured against plate 206 by bolts 210. As best seen in FIG. 4, ratchel wheel 212 includes a plurality of ratchet teeth 226 on its outer circumference. A pawl 228 projecting downwardly from the lever arm 230 is adapted to engage the ratchet teeth 226 and prevent rotation of ratchet wheel 212 in a counterclockwise direction. However, the ratchet teeth 226 are configured to permit free rotation of the ratchet wheel in a clockwise direction.

A bracket 232 (FIG. 4) is secured on inclined face 30 of mounting plate 22 by bolts 234. Bracket 232 can be formed of any suitable material, but for the purpose of economy and ease of manufacture is preferably molded from a rigid plastic. Bracket 232 includes a horizontal shelf 236 which supports a solenoid 238. Solenoid 238 is secured in place by bolts 240 (FIG. 2) which pass through wall 242 of the bracket. Bracket 232 also includes an upstanding rod 244 (FIG. 4). As seen in FIG. 3, rod 244 includes a slot 246 which projects downwardly from the top surface thereof. Lever arm 230 is pivotally mounted in slot 246 by pivot pin 248.

As seen in FIG. 4 solenoid 238 includes a rod 250 which projects upwardly from the top thereof. Rod 250 is pivotally secured to rod 252 by pin 254. As seen in FIG. 3, rod 252 has a slot 256 formed in the top thereof which receives lever arm 230. Lever arm 230 is pivotally secured in slot 256 by pin 258.

A bar 260 is secured to bracket 232 by bolts 262. Bar 260 includes a flange 264 (FIG. 3). A tension spring 266 is connected between lever arm 230 and flange 264 by screws 268 and 270, respectively.

As seen in FIG. 3, flexible tubes 170, 172 and 174, after leaving reel assembly 24, enter housing 272. Referring now to FIGS. 9 to 13, it is seen that housing 272 is basically tubular and is supported at one end by bracket 274.

Figure 11:
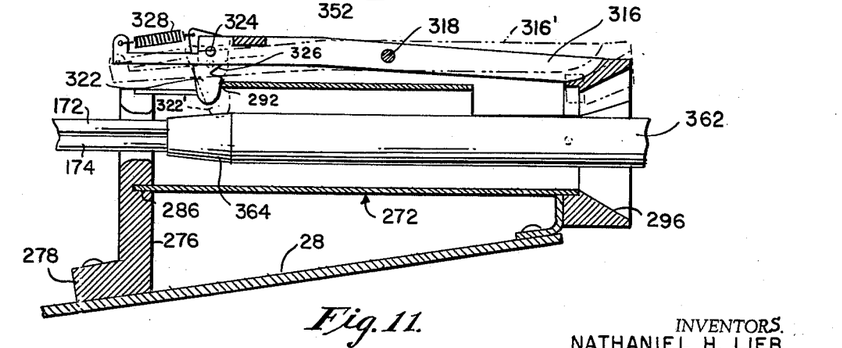
FIG. 11 is a sectional view taken along the line 11—11 of FIG. 10.
Figure 12:
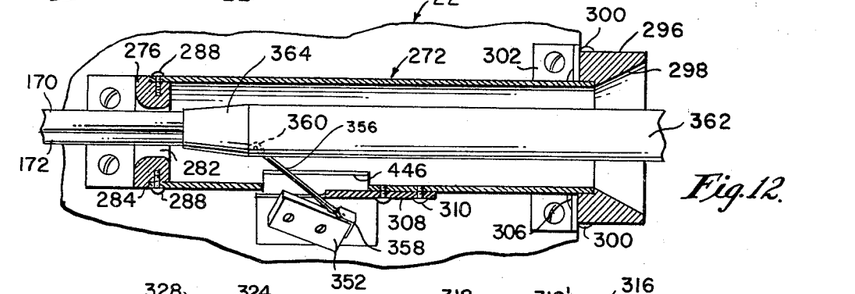
FIG. 12 is a sectional view taken along the line 12—12 of FIG. 9.
Figure 15:
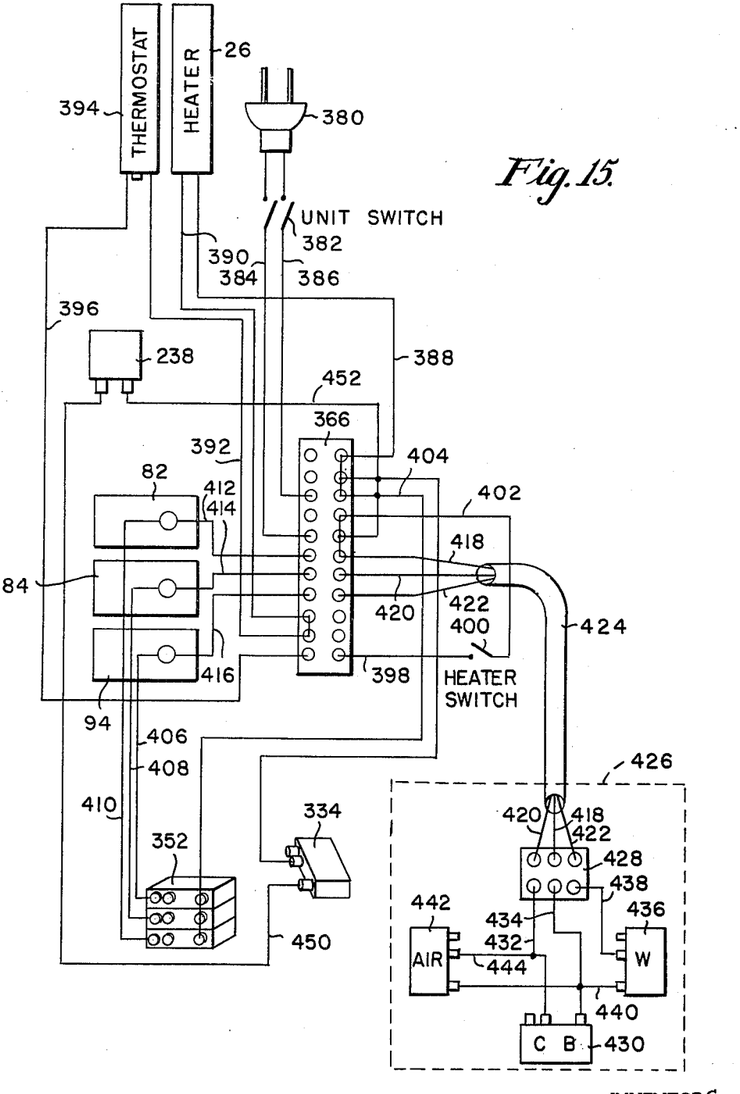

Bracket 274 includes a vertical leg 276 and a flange 278. Flange 278 is mounted on inclined section 28 of mounting plate 22 by bolt 280. Bracket 274 is preferably formed from a molded plastic and includes an upper arcuate opening 282 through which the tubes pass. As seen in FIG. 12, leg 276 includes an outer arcuate recess 284 which receives the rear end of housing 272. As seen in FIG. 11, leg 276 also includes an arcuate slot 286 which receives the lower end of the rear edge of housing 272. The housing is secured to leg 276 by bolts 288.

Figure 9:
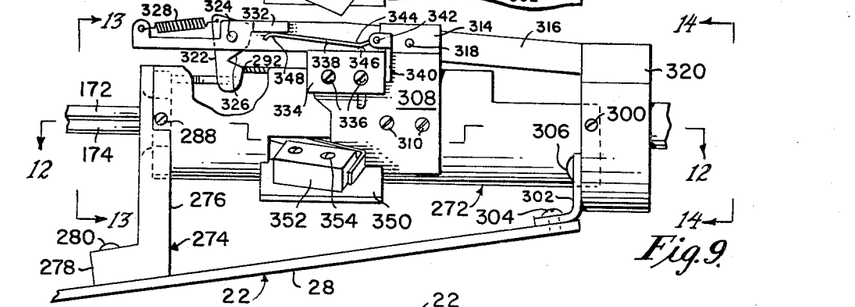
FIG. 9 is a side elevational view of the front end of one retraction element of the reel of this invention.

As pointed out above, housing 272 is basically tubular. However, it includes a basically rectangular opening 290 in the top surface thereof which projects inwardly from the rear edge thereof. Opening 290 terminates in upper edge 292 (FIGS. 9, 11 and 13). Housing 272 also includes a basically rectangular opening 294 in the top surface thereof which projects inwardly from the front edge thereof. The front of housing 272 includes an arcuate collar 296 (FIGS. 11, 12 and 14) which has an inwardly tapering edge 298. Collar 296 is secured to the wall of the housing by bolts 300.

The front of housing 272 is supported by bracket 302 which in turn is secured to inclined surface 28 by bolts 304. Bracket 302 is secured to housing 272 by bolts 306 which threadedly engage the bracket and pass into collar 296 (FIGS. 9 and 12). A plate 308 is secured on one side of housing 272 by bolts 310. Plate 308 includes an inwardly projecting flange 312 (FIG. 10) which passes over the top of housing 272, and which in turn includes an upwardly projecting flange 314 (FIG. 9) which projects vertically above the top of housing 272. A lever arm 316 is pivotally secured to flange 314 by bolt 318. Lever arm 316 includes a collar 320 formed at the forward end thereof. As seen in FIG. 14 collar 320 is complementary to collar 296. Collar 320 may be secured to the lever arm by any suitable means such as welding.

A finger 322 is pivotally secured to lever arm 316 by bolt 324. Finger 322 includes a notch 326 in its forward edge. A tension spring 328 has one end secured in an opening adjacent the top of finger 322 and the other end secured to lever arm 316 by set screw 330. A bar 332 projects from lever arm 316 horizontally across the top of housing 272 (FIG. 13).

A microswitch 334 is secured on plate 308 by bolts 336. Microswitch 334 includes a resilient finger 338 which is pivotally secured on the top of the microswitch by clip 340 and associated pin 342. Finger 338 includes an indented portion 344 which is in contact with resiliently mounted switch button 346. The outer end of finger 338 is convex, as shown at 348 in FIG. 9. As seen in FIG. 9, convex end 348 is contacted by bar 332.

Plate 308 includes a flange 350 (FIG. 9) which projects outwardly and downwardly from the main body of the plate. A second microswitch 352 is secured on flange 350 by bolts 354. A resilient finger 356 is secured on microswitch 352 by clip 358 and an associated pivot pin. Finger 356 also includes a convex end 360.

The structure described above is adapted for use with any item of dental equipment. By way of example, a housing 362 (FIGS. 11 and 12) for dental equipment is shown. Housing 362 can be the housing for a chip blower, dental handpiece, or syringe. The rear of housing 362 includes an adaptor nut 364 for securing air and water tubes in place.

To aid in the electrical interconnection of all of the elements of the assembly described above, each individual assembly is provided with a terminal strip 366 (FIGS. 2 and 3). As seen in FIG. 2, terminal strip 366 is mounted on inclined section 28 of mounting plate 22 by bracket 368. Bracket 368 includes a first vertical leg 370, a second vertical leg 372 and a horizontal bridging section 374.

In use, the device of this invention will be mounted in a dental console cabinet. When working on a patient, the dentist will determine which dental instrument he needs, grasp the instrument and pull it longitudinally from the console. As is apparent from FIG. 4, the tubes 170, 172 and 174 will move in the direction of arrow 376 when the instrument is removed. This in turn will cause a clockwise rotation of the disc 194 on which the tubes are wound. The rotational movement of the disc, its associated plates, ratchet wheel 212 and distributor body 150 is shown by the arrow 378 in FIG. 4. Since the ratchet teeth 226 are configured as shown in FIG. 4, pawl 228, which is resiliently mounted by spring 266, will not interfere with the rotational movement of the aforementioned elements. When the dental instrument has been pulled to the desired length of tubing, the dentist will release the pulling pressure against the dental instrument. This will permit the disc 194 and the elements secured thereon to rotate in a counterclockwise direction under the urging of tension spring 216 (FIG. 6) which is being wound more tightly as the tubing is withdrawn. The tubing will only be drawn slightly backward in view of the fact that continued backward movement of the tubing is prevented by the engagement of pawl 228 in one of the ratchet teeth 226 (FIG. 4). Spring 266 insures the immediate seating of the pawl within the ratchet teeth.

From the above description it is apparent that the reel mechanism of this invention is substantially infinitely adjustable. Thus, the only limitation on the adjustability resides in the number of ratchet teeth which can be provided in ratchet wheel 212. Since the dentist does not require a fine degree of tolerance in the length of tubing used, for all practical purposes the reel mechanism of this invention is infinitely adjustable. This is especially true in light of the prior art pulley systems wherein only one or a small number of stop positions for the withdrawal of the tubing were provided. The wheel formed from disc 194 and plates 202 and 206 also provides a compact storage area for the tubing.

A schematic electrical diagram for the reel assembly of this invention is shown in FIG. 15. A plug 380 is provided for insertion into any conventional electrical receptacle or other source of voltage. The entire unit is readied for use by closing the unit switch 382. Leads 384 and 386 coming from the power source are connected to terminal strip 366.

One circuit coming off terminal strip 366 includes a lead 388 going to heater 26. A lead 390 connects heater 26 back to terminal strip 366. Lead 390 is connected through the terminal strip to lead 392 which goes to thermostat 394. Lead 396 connects the thermostat back to the terminal strip and is connected through the terminal strip with lead 398. Lead 398 is connected with a manual heater switch 400, which in turn is connected through lead 402 back to the terminal strip. The circuit is completed through the terminal strip and back through lead 384 to the current source.

It is thus seen that the heater and its associated thermostat are on an independent electrical circuit. When it is desired to heat the incoming water, heater switch 400 will be closed. When it is unnecessary to heat the incoming water, heater switch 400 will be left open. Even with the heater switch left open, the water can still freely pass through the heater in going from the distributor block 54 to solenoid 94.

A second circuit includes lead 386 which is electrically connected to lead 404 at the terminal strip 366. Lead 404 is in turn connected to microswitch 352. Microswitch 352 has leads 406, 408 and 410 emanating therefrom which are connected to solenoids 94, 84 and 82, respectively. Thus microswitch 352 is adapted to control the air solenoid 82, the chip blower solenoid 84 and the water solenoid 94. Solenoids 82, 84 and 94 are connected through leads 412, 414 and 416, respectively, to terminal strip 366. Leads 412, 414 and 416 are positioned on the terminal strip 366 opposite leads 418, 420 and 422, respectively. These latter leads are enclosed in a cable sheathing 424 which connects with a foot control, shown in phantom at 426.

Within the foot control 426 leads 418, 420 and 422 are connected to terminal strip 428. Lead 418 is common to all circuits within the foot control and is the middle connection on the terminal strip. The foot control is adapted for use with varying combinations of air and water. When it is desired to use the dental instrument associated with the reel assembly solely as a chip blower, the foot control will contain a button on its top surface which is schematically shown at 430. When this button is depressed, a circuit is completed through lead 420, terminal strip 428, lead 432, the foot button switch 430, lead 434, terminal strip 428, lead 418 and back through the terminal strip 366 and lead 384. Thus, whenever this button is depressed by the foot of the dentist, air will pass through the chip blower solenoid 84 and out through the dental instrument. Neither of the other solenoids are actuated at this time.

When a dental handpiece is connected to the reel mechanism, the dentist will have the option of using the handpiece in combination with a water spray or in combination with air spray passing through the spray tubes of the handpiece. The use of the water or the air in the handpiece is controlled through the foot control 426. By way of example, if the dentist should rotate the foot pedal to the right, switch 436 will be engaged. With the switch so engaged, a circuit is completed from water solenoid 94 through lead 422, terminal strip 428 and lead 438 to switch 436. The circuit continues from switch 436 through lead 440 up through lead 418 and back through lead 384. Through suitable camming in the foot control, which is well known in the art, in addition to opening water solenoid 94, air solenoid 82 will likewise be opened by the rotation of the foot pedal to the right. Thus, the air solenoid 82 will supply the air for driving an air driven dental handpiece, and, in addition, by suitable branching within the handpiece, will supply the air for furnishing an air-water mixture emanating from the spray tubes in the handpiece. The water for the mixture will pass through solenoid 94. Any dental handpiece can be used in connection with this circuitry. By way of example, the handpieces disclosed in Patents No. 3,074,167, No. 3,120,706 and No. 3,199,196 can be used.

When it is desired to use the air driven handpiece in combination with an air spray for removing chips, the foot control pedal can be rotated to the left thereby engaging switch 442. In this case, a circuit will be completed through solenoid 84, lead 420, terminal strip 428, lead 432 and lead 444. The circuit continues through switch 442, lead 434 and back through lead 418 to lead 384. Simultaneously with the opening of solenoid 84, air solenoid 82 will be opened through appropriate camming and switching within the foot control. Thus, the air from solenoid 82 will again provide the driving power for an air driven handpiece and the air from solenoid 84 will provide the chip dispensing air through the spray tubes in the handpiece. By way of non-limiting example, the air through solenoid 82 can be supplied at 40 p.s.i. and the dispensing air through solenoid 84 can be supplied at 15 p.s.i.

The circuitry has been described with respect to a foot control having a two position pedal and a separate depressible switch on its top. The specific control used forms no part of this invention. Thus, the only point that is critical to this invention is that some means be provided for separately opening solenoids 82, 84, 94 or for opening these solenoids in varying combinations. Any of the foot controls or hand controls know to the art could easily be adapted for carryig out the teachings of this invention, and the specific circuitry for actuating these solenoids could be varied within the skill of the art without departing from the scope of this invention.

Referring again to FIG. 12, it is seen that when the equipment housing 362 is in a retracted position whereby it will be confined within housing 272, finger 356 of microswitch 352 will be depressed by the housing 362. Thus, as seen in FIG. 12, finger 356 passes through a slot 446 in housing 272 and into the path of housing 362. Microswitch 352 is normally closed and is only opened when finger 356 is depressed. Maintaining housing 362 in its normal retracted position will automatically depress the finger 356, thereby keeping microswitch 352 in an open condition. When the dental instrument is withdrawn, resilient finger 356 will automatically be raised by a resiliently mounted switching button in microswitch 352. The raising of this button causes the closing of microswitch 352. At this time, the microswitch will be in the condition shown in FIG. 15.

It is thus seen that so long as a dental instrument is within housing 272, microswitch 352 will be open. Therefore, the circuits including solenoids 82, 84 and 94 will also be open and thus no air or water can pass through these solenoids. Having this circuitry enables the dentist to use a single foot control for controlling all five reel devices shown in FIG. 1. Thus, a dentist will only be using a single dental instrumnet at any one time. When this dental instrument is withdrawn from the console, switch 352 associated with that instrument will be closed. A single foot control can be connected to all five independent reel devices by leading cable 424 to a common terminal strip. Thereafter, separate parallel leads 418, 420 and 422 will be directed to each of the reel devices. When the foot control is actuated the only dental instrument which will receive water or air will be that which has its microswitch 352 closed. Since the microswitch 352 will only be closed for the instrument which is withdrawn from housing 272, air or water can only pass through the solenoids associated with that instrument. Of course, it is within the purview of this invention to have a separate foot control for each reel assembly if it is desired.

A separate circuit is provided for permitting and limiting withdrawal of a dental instrument back into housing 272 after the dentist has completed his use of the instrument. In this circuit, current will pass through incoming lead 386, through terminal strip 366, and lead 448 to microswitch 334. The circuit continues through the microswitch to lead 450 which is connected to solenoid 238. Soleond 238 is connected through lead 452 back to terminal strip 366. The circuit is completed through the terminal strip to lead 384 back to the voltage source.

Figure 10:
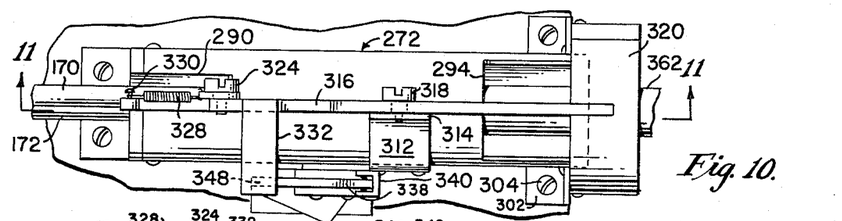
FIG. 10 is a top plan view of the portion of the element shown in FIG. 9.

Referring now to FIGS. 9 and 10, it is seen that bar 332 contacts finger 338 of microswitch 334. With the bar in the position shown in FIG. 9, microswitch 334 is open. When the dental instrument is withdrawn from housing 272, microswitch 334 remains in an open position. When the dentist has completed the use of the instrument, the instrument is raised thereby raising the associated tubing. In doing this, the tubing will lift collar 320 (FIGS. 9 and 14). This in turn will cause a pivoting of lever arm 316 around bolt 318 to the position shown in phantom at 316'. The raising of lever arm 316 in turn results in the lowering of finger 322. When the finger 322 is lowered to the position shown at 322', rear edge 292 of opening 290 will engage notch 326 in the finger. This engagement is secured by the pivoting of the finger around pin 324 and the force exerted by spring 328.

By reference to FIG. 9, it is seen that the raising of the forward end of lever arm 316 results in the lowering of the rear end of the arm and the consequent depression of bar 332. This in turn results in the depression of microswitch finger 338, thereby closing the microswitch. By reference back to FIG. 15, it is seen that the closing of microswitch 334 results in the completion of the circuit including solenoid 238, thereby causing the activation of the solenoid. As seen in FIG. 4, when solenoid 238 is activated, rod 250 is drawn downwardly into the solenoid. This in turn results in the pivoting of lever arm 230 around pin 248, thereby raising the rear end of the lever arm to the position shown at 230' in FIG. 4.

Likewise, associated pawl 228 will be raised to the position shown at 228 in FIG. 4.

At this time, the pawl 228 will be disengaged from the ratchet wheel 226. With the pawl so raised, there is no force acting against spring 216 and therefore spring 216 will cause the rotation of disc 194 and its associated structure in the direction of arrow 224 in FIG. 6. This causes the winding of the tubes 170, 172 and 174 on flange 200 and the consequent withdrawal of the dental instrument back into housing 272. This withdrawal is continued until the adaptor nut 364 on housing 362 contacts the lower end of finger 322 as shown in FIG. 11. This contacting forces the lower end of the finger rearwardly and disengages the notch 326 from edge 292. At the same time, the adaptor nut causes the rear end of lever arm 316 to be raised and the lever arm to return to the position shown in FIG. 9. With the lever arm so raised, finger 338 will be raised to the position shown in FIG. 15, with microswitch 334 opened, solenoid 238 will again return to its closed position. At that time, rod 250 (FIG. 4) will be raised and pawl 228 will again engage ratchet wheel 212. This prevents all further rotational movement of the ratchet wheel and immediately terminates the winding of the flexible tubes on flange 200 (FIG. 6).

It is thus seen by reference to FIG. 15 that the heater circuit, the driving circuit for the winding, and the circuit for the air and water solenoids are all independent of each other. So long as a handpiece or dental instrument remains in housing 272, solenoid microswitch 352 will be open and no air or water can pass through the dental instrument. The use of the finger 322 as a trip mechanism insures that an instrument will always be withdrawn into the reel mechanism to the same extent whenever use is terminated.

The device of this invention can be used as a single reel mechanism, a bank of five reel mechanisms as shown in FIG. 1, or in a bank of as many reel mechanisms as is desired. The individual dental instruments used can be varied at the will of the dentist. Thus, the syringe, three contra-angle handpieces and one straight handpiece shown are merely exemplary. Another instrument which may be substituted for one of the ones shown is a chip blower. Additionally, where desired, additional reel assemblies can be added to accommodate additional instruments.

The lever arm 316 and trip finger 332 are exemplary of the many switch arrangements that may be used for retracting the tubes onto the reel. Thus, a finger actuated switch may be placed directly on the handpiece or on supporting plate 22. Additionally, the retraction can be actuated by lowering the tubes associated with the dental equipment rather than raising the tubes. A hydraulic piston can be substituted for solenoid 238 and the entire retraction system can be hydraulic.

We claim:

1. A device for furnishing a fluid to a dental instrument comprising a plate, at least one tube passing through said plate, said tube adapted to supply fluid to a dental instrument secured at the end thereof, releasable stop means associated with said tube, said stop means permitting said tube to be pulled through said plate for any desired length, but preventing said tube from being retracted through said plate when said length is reached, means for retracting said tube through said plate, and electrical means for releasing said stop means to permit the retraction of said tube through said plate.

2. The device of claim 1 wherein said release means includes a member which is adapted to be contacted by said tube, whereby the contacting of said member by said tube will activate said release means.

3. The device of claim 1 wherein said dental instrument is secured on said tube, and further including a stop member which is adapted to be contacted by said dental instrument when said dental instrument is retracted, said stop member adapted to prevent further retraction of said tube when contacted by said dental instrument.

4. The device of claim 1 wherein said electrical means comprises switch means, said switch means adapted to be controlled by the predetermined movement of a dental handpiece secured on said tube.

5. A reel for a plurality of flexible tubes comprising a tube wheel, a plurality of flexible tubes wound on said tube wheel, each of said tubes adapted to have a fluid passed therethrough, a distributor shaft associated with said tube wheel, said distributor shaft having a plurality of channels therein, a distributor body rotatably mounted on said distributor shaft, said distributor body having ports in communication with said channels, said flexible tubes being secured at said ports to said distributor body whereby fluids passing through said channels are passed into said flexible tubes, means adapted to rotate said tube wheel to wind said tubes thereon, releasable stop means associated with said tube wheel which permits the unwinding of said tubes but prevents the rewinding of said tubes on said tube wheel, said releasable stop means comprising a ratchet wheel having a plurality of teeth around the perimeter thereof and a pawl contacting said ratchet wheel and engageable in any one of said teeth, and electrical means for releasing said pawl from said ratchet wheel to permit the rewinding of said tubes on said tube wheel.

6. The reel of claim 5 wherein said distributor shaft is fixedly mounted and said distributor body and said tube wheel rotate about said distributor shaft.

7. The reel of claim 5 and further including heater means having a channel for liquid therein, said heater channel being in liquid communication with one of said channels in said distributor shaft.

8. A reel for flexible tubing comprising a wheel, a plurality of flexible tubes wound on said wheel, means associated with said wheel for supplying a first fluid to one of the said tubes, means associated with said wheel for supplying a second fluid to another of said tubes, means for controlling the supply of said fluids to said tubes, said tubes being connected to a dental instrument, said dental instrument adapted to close switch means which are in circuit with said controlling means, and said switch means being closed when said dental instrument is pulled in a direction to unwind said tubes from said wheel.

9. A reel for flexible tubing comprising a wheel, a plurality of flexible tubes wound on said wheel, means associated with said wheel for supplying a first fluid to one of the said tubes, means associated with said wheel for supplying a second fluid to another of said tubes, and means for controlling the supply of said fluids to said tubes, said controlling means comprising electrically actuated valve means, said valve means being actuatable when said tubes are unwound from said wheel.

10. A device for furnishing fluids to a plurality of dental instruments comprising a mounting plate, a plurality of reel assemblies secured on said mounting plate, each of said reel assemblies being associated with a dental instrument, each of said reel assemblies comprising a reel, at least one flexible tube wound around said reel, said flexible tube adapted to have a fluid pass therethrough and adapted to be connected to a dental instrument which utilizes said fluid, means adapted to rotate said wheel to wind said tube thereon, releasable stop means associated with said wheel which permits the unwinding of said tube but prevents the rewinding of said tube on said wheel, and electrical means for releasing said stop means to permit the rewinding of said tube on said wheel.

References Cited

UNITED STATES PATENTS 2,526,256  10/1950  Mihara ___________ 242—107.6

ROBERT PESHOCK, Primary Examiner